C. J. ANDERSON.
REEL HOLDER.
APPLICATION FILED APR. 12, 1920.
1,366,340.
Patented Jan. 25, 1921.
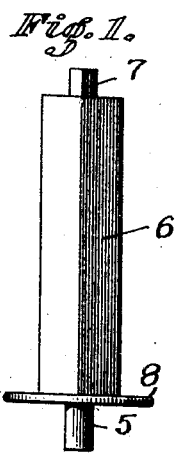
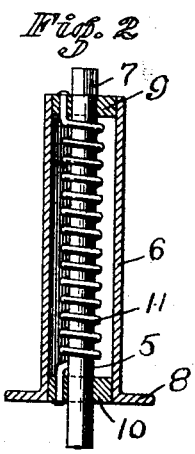
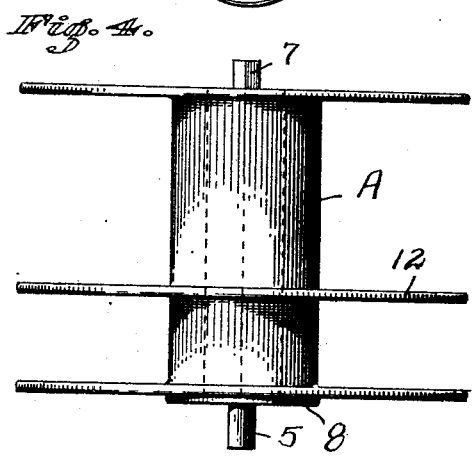
WITNESS
L. Olsen
INVENTOR
C. J. ANDERSON
BY
Munn & Co
ATTORNEYS

UNITED STATES PATENT OFFICE.

CHARLES J. ANDERSON, OF FORT BRAGG, CALIFORNIA.

REEL-HOLDER.

1,366,340.  Specification of Letters Patent.  Patented Jan. 25, 1921.

Application filed April 12, 1920. Serial No. 373,146.

*To all whom it may concern:*

Be it known that I, CHARLES J. ANDERSON, a citizen of the United States, residing at Fort Bragg, in the county of Mendocino and State of California, have invented new and useful Improvements in Reel-Holders, of which the following is a specification.

The present invention relates to a reel holder and has reference more particularly to a device for holding fish reels.

The primary object of the invention is to provide a holder of the class described which is so constructed as to render the same adapted to readily receive a winding reel, preferably a fishing reel so that the line may be wound upon the reel in an easy and advantageous manner.

A further object of the invention is to so construct the holder that the reels may be easily exchanged or interchangeable, so to speak. In this connection, I propose to construct the holder so that a reel may be introduced thereon and removed therefrom without manipulating catches or other forms of fastening means.

A still further object of the invention is to so construct the holder that the reel is received thereon and made to coöperate with the holder in such a manner that a sudden jerk or hard pull on the line will be overcome by the influence of a shock absorbing device incorporated in the holder.

With these and further objects in view, the invention will be better understood upon reference to the accompanying drawing, forming a part of this application. In said drawing—

Figure 1 is a plan view of the holder;

Fig. 2 is a longitudinal section;

Fig. 3 is an end view, and

Fig. 4 is a plan view showing a reel as introduced upon the holder.

In fishing for salmon and other large fish, it is very often desirable to use more than one line. However, when a strike is made, it is inconvenient to play the fish or land him by a hand line, and for this reason, as a practical solution of the problem involved, the present invention proposes to employ a reelholder which is made to receive the reel for conveniently winding the line on the reel and landing the fish. The advantages of this holder are such that a number of lines each wound upon a reel may be used and when a strike is made, the reel may be introduced upon the holder and the line wound in or put out as occasion demands. Of course, the interchangeable features that is to say the idea of retaining the holder readily applicable to receive the reel is an important feature. It is, of course, understood that the reel may be used upon the holder as a more or less permanent fixture.

In the preferred form of the invention, I would propose to construct the holder with a spindle or shaft 5 which is inclosed in a squared casing, such as 6, with its respective ends protruding therefrom and with the end 7 squared so that a crank may engage the same for turning the holder and the reel as will be hereinafter described. The casing 6 will terminate at one end in a disk flange 8.

One end of the casing is closed by a collar 9 which is fixed to the spindle or shaft 5 while the opposite end of the casing 6 is closed by a collar 10 which is fixed to the said casing. Inclosed within the casing 6 and surrounding the spindle or shaft 5 is a spiral spring 11, one end of which is fixed to the collar 9 and the other end is fixed to the collar 10. The holder may be mounted on any suitable supporting means in either a vertical or horizontal position and the reel represented by the reference character A, and having a squared axial opening, will be introduced on the holder with the squared casing 6 providing a mounting for the same. The squared arrangement of the casing 6 and the opening in the reel will compel these two structures to rotate together.

As will be seen in Fig. 4, the reel is received upon the holder and when a crank engages the squared end 7 of the spindle or shaft 5, the reel will be rotated with the holder. Should the fish which is being brought in on the end of the line wound upon the reel exert an abnormal pull on the line, or otherwise make a strain on the line in excess of its holding capacity, the normal influence of the spring 11 will be overcome, thus permitting the same to act as a shock absorber and in this way prevent the line from breaking. The action of the spring in this instance will be readily seen insomuch as one end is secured to the collar 9 which is fixed to the spindle or shaft 5 whereas the other end is fixed to the collar 10 which is fixed to the casing 6 of the holder.

Ordinarily the strength of the spring is such as to enable the line to be wound upon the reel through the spindle or shaft 5 without giving any appreciable amount which would interfere with the proper functioning of the device.

In order to accommodate the several sinkers which are used on the line particularly in fishing for salmon, I would prefer to use a reel having an intermediate disk flange as shown at 12. In this manner in winding up the line, the sinkers as they come up could be guided over the flange 12 and held on the reel separate from the line *per se*.

I claim:

In combination, a fishing reel having a squared opening and an intermediate flange, a holder including a squared casing adapted to be presented in said squared opening in the reel for mounting the reel rotatable with the holder, a shaft engaged in said casing having means at one end adapted to receive a rotating means for the holder, said shaft having means connecting the same in driving relation with the holder, comprising a coil spring wrapped around the shaft with one end anchored in a collar which in turn is fixed to the shaft, and with the opposite end of the spring anchored in a collar which in turn is fixed to the casing.

CHARLES J. ANDERSON.